US008388818B1

(12) United States Patent
Menezes (10) Patent No.: US 8,388,818 B1
(45) Date of Patent: Mar. 5, 2013

(54) PHOTOELECTROCHEMICAL GENERATION OF HYDROGEN

(76) Inventor: Shalini Menezes, Thousand Oaks, CA (US)

( * ) Notice: Subject to any disclaimer, the term of this patent is extended or adjusted under 35 U.S.C. 154(b) by 1624 days.

(21) Appl. No.: 11/778,637

(22) Filed: Jul. 16, 2007

(51) Int. Cl.
*C25B 1/04* (2006.01)
*C25B 15/08* (2006.01)
*C25B 11/04* (2006.01)

(52) U.S. Cl. ........ 204/248; 204/266; 205/340; 205/637; 205/638

(58) Field of Classification Search .................. 205/340, 205/619
See application file for complete search history.

(56) References Cited

U.S. PATENT DOCUMENTS

| | | | | |
|---|---|---|---|---|
| 4,314,984 A * | 2/1982 | Lawson et al. | ................ | 423/579 |
| 4,335,266 A * | 6/1982 | Mickelsen et al. | ............ | 136/260 |
| 4,460,444 A * | 7/1984 | Maskalick | ................ | 205/619 |
| 4,525,436 A * | 6/1985 | Yamazaki | ................ | 429/111 |
| 4,601,960 A * | 7/1986 | Menezes et al. | ............. | 429/111 |
| 4,656,103 A * | 4/1987 | Reichman et al. | ........... | 429/111 |
| 5,286,306 A | 2/1994 | Menezes | | |
| 5,709,791 A | 1/1998 | Hibino et al. | | |
| 6,071,327 A | 6/2000 | Hibino et al. | | |
| 6,093,305 A | 7/2000 | Hibino et al. | | |
| 2003/0230338 A1 | 12/2003 | Menezes | | |
| 2004/0262154 A1* | 12/2004 | Gibson et al. | ................. | 204/280 |
| 2005/0211290 A1 | 9/2005 | Deng et al. | | |

OTHER PUBLICATIONS

Lewis, Nathan, Artificial Photosynthesis, American Scientist, vol. 83, No. 6, Dec. 1995, pp. 534-541.*
Turner et al, Photoelectrochemical Systems for H2 Production, Hydrogen, Fuel Cells, and Infrastructure Technologies, FY 2003 Progress Report, pp. 1-5.*
J. K. Nørskov, T. Bligaard, A. Logadottir, J.R. Kitchin, J.G. Chen, S. Pandelov, and U. Stimming, Trends in the Exchange Current for Hydrogen Evolution, J. Electrochem. Soc. 152, J23 (2005).
P. Bogdanoff, P. Friebe, and N. Alonso-Vante, A New Inlet System for Differential Electrochemical Mass Spectroscopy Applied to the Photocorrosion of p-InP(111) Single Crystals, J. Electrochem. Soc. 145, 576 (1998).
T. Kinumoto, K. Takai, Y. Iriyama, T. Abe, M. Inaba, and Z. Ogumi, Stability of Pt-Catalyzed Highly Oriented Pyrolytic Graphite Against Hydrogen Peroxide in Acid Solution, J. Electrochem. Soc. 153, A58 (2006).
S.-I. Ho, D.P. Whelan, K. Rajeshwar, A. Weiss, M. Murley, and R. Reid, Electrocatalytic Modification of Indium Tin Oxide Electrode Surfaces, J. Electrochem. Soc. 135, 1452 (1988).
S.A. Abbaro, A.C.C. Tseung, and D.B. Hibbert, Synergism in Hydrogen Evolution on Platinized Tungsten Trioxide in Acid Medium, J. Electrochem. Soc. 127, 1106 (1980).
U.S. Appl. No. 11/420,674, Menezes et al.

* cited by examiner

*Primary Examiner* — Harry D Wilkins, III (57) ABSTRACT

Lightweight photoelectrochemical system for real-time hydrogen production from water and sunlight, using lightweight multi-junction photo electrodes made from the highly reliable and efficient copper indium selenide thin films, preferably made by low-cost electrodeposition on flexible foil.

20 Claims, 7 Drawing Sheets

PHOTOELECTROCHEMICAL GENERATION OF HYDROGEN

FIELD OF THE INVENTION

The present invention relates generally to the field of photoelectrolysis of water, with sunlight as the sole power source. More specifically, this invention relates to the design of photoelectrochemical (PEC) systems comprising hybrid photoelectrodes based on copper indium selenide material for generation of hydrogen ($H_2$) and oxygen ($O_2$) gases.

BACKGROUND OF THE INVENTION

The development of low cost, renewable energy capabilities is critical for future air, terrestrial and space transportation, as well as for distributed electric power generation. $H_2$ can replace fossil fuels for the production and storage of energy. $H_2$ can be produced from various resources: renewables, nuclear energy, and coal. High efficiency and low emissions are achieved through use of fuel cells. $H_2$ fuel cells can power cars, boats and aircraft. Its generation in large quantities at low cost can lead to a new energy resource and provide energy self-sufficiency. A renewable method for generating $H_2$ uses only sunlight and water, considerably reducing the costs and environmental impacts of fossil and nuclear fuels.

PEC technology affords real-time $H_2$ production with water and solar energy. A PEC $H_2$ production system integrates a semiconductor photoelectrode with an electrolyzer into a single, monolithic device, to produce $H_2$ directly from water, using only sunlight. High performance solar PEC systems could offer the most efficient option for low cost, safe, lightweight $H_2$ production to fuel the emerging fuel cell systems. Harvesting energy from the environment makes it possible to power micro fuel cells in real-time on board transportation vehicles or remote locations. The fuel cell becomes regenerative when the system is integrated with in-situ $H_2$ production.

An integrated PEC cell offers the potential for cost effective, renewable hydrogen generation. Both n- and p-type semiconductors can be used for PEC splitting of water into $H_2$ and $O_2$. A PEC cell can provide about 30% efficiency advantage over a separate p/n photovoltaic (PV) system that is coupled to an electrolysis cell; it avoids the energy losses in the ohmic contact due to the mismatch of the Fermi levels and the band edges. So far, no single semiconductor has been identified, that can provide: (1) Correct energetics: bandgap, band edge overlap to drive the electrolysis reactions; (2) Fast charge transfer, and (3) Stability in an aqueous environment. Obstacles to direct photoelectrolysis of water are the lack of efficient light absorption when bandgap <2.0 eV, corrosion of the semiconductor, and unmatched energetics. The bandgaps of photochemically stable semiconductors are too large for efficient light absorption. Semiconductors with bandgaps in the optimal solar absorption range are typically thermo-dynamically unstable with respect to oxidation. The theoretical limit for water-splitting voltage is 1.23V. Practically, however, due to the existence of overpotentials at the electrolyte/electrode interfaces, the voltage needed is approximately 1.6V or greater. Thus a PV structure generates a voltage of approximately 1.6V or greater when operating under solar radiation.

A number of approaches have been tried, to overcome some of the obstacles to the direct splitting of water with a single electrode, including using: (a) simultaneously illuminated bi-photoelectrodes, (b) hybrid or bi-polar photoelectrode comprising a PEC cell and PV cell, and (c) Multiple-junction PEC cells. Several prior inventions and publications have disclosed designs for a variety of PEC cells. Most prior art PEC designs suffer from several shortcomings, including insufficient voltage to split water; the need for an external electrical bias for the electrolysis; corrosion in the electrolyte during operation for extended periods; expensive fabrication methods for the photoelectrodes; and low conversion efficiency. Therefore, there is a need to devise an efficient, stable, cost effective PEC cell with sufficient voltage to produce hydrogen from water, with a solar-to-hydrogen efficiency >10%.

SUMMARY OF THE INVENTION

Accordingly the main objective of this invention is to present an efficient and stable, lightweight PEC system with sufficient voltage to drive the photoelectrolysis of water using renewable solar energy. The invention further seeks to provide two alternate PEC cell configurations to address the problem of voltage matching. These configurations derive special benefits by basing both photoelectrodes on the proven high efficiency and stability CIS and its alloys. The primary PEC cell configuration increases the cell voltage with a new CIS based bi-hybrid photoelectrode PEC system. Each photoelectrode combines a solid-state device with a transparent conducting material (TCM) that forms a liquid junction with the electrolyte. The alternate cell configuration is also based on the CIS photoelectrodes; it reduces the voltage requirements for water splitting by using an intermediary step for splitting a hydrogen halide. Several variants of these main configurations are designed to provide (i) PEC systems with inexpensively made efficient and stable photoelectrodes; (2) Optimum photoelectrode configuration and low weight for efficient, in-situ hydrogen generation on site; and (3) PEC cell design that maximizes the efficiency of hydrogen and oxygen production for different applications.

BRIEF DESCRIPTION OF THE DRAWINGS

FIG. 6 Shows a PEC cell with the two photoelectrodes constructed on (a) opposite walls of the electrolytic cell for bifacial illumination, and adjacent (b) angular and (c) circular walled cells with a membrane separating the two compartments in each cell.

FIG. 11 Shows PEC cell designs with electrically attached electrodes similar to that in FIG. 10, using (a) multijunction photocathode comprising two or more PV cells with an inert metal anode, (b) multijunction photoanode comprising two or more PV cells and metal cathode, and (c) multijunction photoanode and photocathode, each comprising two or more PV cells that absorb light at different wavelengths.

| Reference Numerals | |
|---|---|
| 20 | PEC system |
| 21 | Illumination |
| 22 | Electrolysis cell |
| 23 | Electrolyte |
| 24 | Separator membrane |
| 25 | Anode compartment |
| 26 | Cathode compartment |
| 27 | Electrolytic junction |
| 28 | Anode, photoanode |
| 29 | Cathode, photocathode |
| 30 | Substrate |
| 31 | Contact |
| 32 | np solid-state PV junction |
| 33 | TCM |
| 34 | n-CIS absorber |
| 35 | p-buffer |
| 36 | Encapsulant |
| 37 | pn junction |
| 38 | p-CIS absorber |
| 39 | n-buffer |
| 40 | Metal catalyst |
| 41 | Third compartment |
| 42 | Fourth compartment |
| 43 | Fifth compartment |
| 44 | Hydrophobic membrane |

DETAILED DESCRIPTION OF THE PREFERRED EMBODIMENTS

Figure 1:
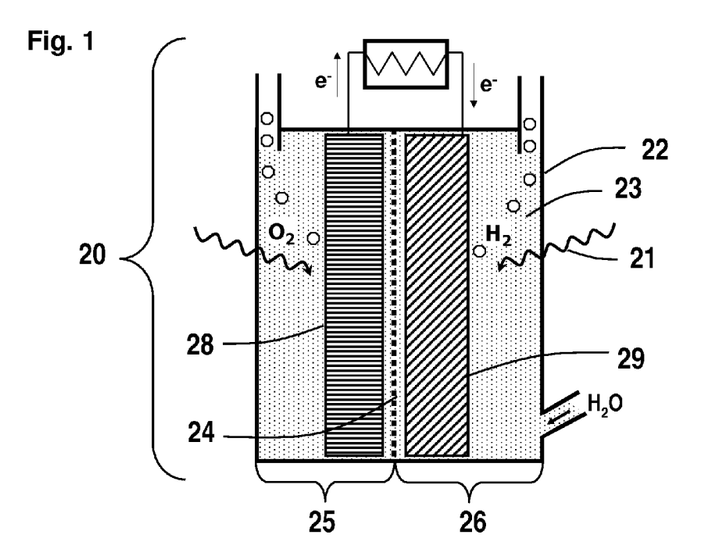
FIG. 1 Shows a cross sectional schematic of an exemplary PEC cell for water splitting into $H_2$ at the photocathode and into $O_2$ at the photoanode with the two compartments separated by an $H^+$ and $OH^-$ ion conducting membrane.

This invention provides a new hybrid bi-photoelectrode PEC system for hydrogen generation. A preferred embodiment combines the concepts of bi-photoelectrode and hybrid configurations to produce a hybrid bi-photoelectrode PEC system. The schematic of the PEC system 20 in FIG. 1 illustrates the basic concept for splitting $H_2O$ into $H_2$ and $O_2$ under illumination 21. The system 20 comprises an electrolysis cell 22, containing an electrolyte 23. Electrolysis of water can proceed in either acidic electrolyte, such as $H_2SO_4$ or an alkaline electrolyte such as KOH. Half reactions in acidic electrolyte typically include:

$2H^+ + 2e^- \rightarrow H_2$ (reduction at cathode)

$2H_2O \rightarrow 4H^+ + O_2 + 4e^-$ (oxidation at anode)

Half reactions in alkaline electrolyte include:

$2H_2O + 2e^- \rightarrow H_2 + 2OH^-$ (reduction at cathode)

$4OH^- \rightarrow O_2 + 2H_2O + 4e^-$ (oxidation at anode)

For both types of electrolyte the half reactions lead to an overall reaction of: $2H_2O \rightarrow H_2 + O_2$.

The electrolyte parameters such as pH, ionic strength, solution composition, etc. can be adjusted to be compatible with the energetics and stability of the photoanode and the photocathode.

A separator membrane or frit 24 divides a PEC cell 22 into two compartments 25 and 26 in which the oxidation and reduction half reactions take place, respectively. The separator 24 allows exchange of $H^+$ and $OH^-$ ions for the electrolysis, but separates and confines the $H_2$ and $O_2$ gases into two different compartments of the cell. The membrane 24 can be applied onto a porous substrate. The porous substrate allows the electrolyte to flow through the substrate, yet provides mechanical strength to support the membrane 24. The membrane 24 can be made to be extremely thin to reduce cost. An example of the supporting material is micro-porous polypropylene. The membranes are generally installed between the two electrodes in a way that allows for maximum radiation to reach the photoelectrodes.

The anode compartment 25 contains an anode or photoanode 28 for $O_2$ evolution and the cathode compartment 26 contains a cathode or photocathode 29 for $H_2$ evolution. Each photoanode 28 and photocathode 29 is a composite of a thin film semiconductor heterojunction PV device and a PEC junction 27 between the TCM layer and the electrolyte. A typical photoanode 28 will have a configuration of substrate/n/p PV cell/TCM-electrolyte junction and a typical photocathode 29 will have a configuration of substrate/p/n PV cell/TCM (catalyst)/electrolyte junction. In combination they can generate sufficient driving force for $H_2$ and $O_2$ generation from water in the PEC cell. High efficiency for photoelectrolysis of water can be obtained by matching the voltage generated between the photoanode 28 and photocathode 29 to the operating voltage of the electrolyzer. Illumination of each electrode will produce photovoltage ($V_{hv}$)

$V_{hv}^A$ for photoanode $= V_{hv}^A(PV) + V_{hv}^A(PEC)$ $V_{hv}^C$ for photocathode $= V_{hv}^C(PV) + V_{hv}^C(PEC)$ The resultant photovoltage $V_{hv}^A + V_{hv}^C$ is expected to be greater than 1.6V to induce spontaneous photoelectrolysis. It can drive the water reduction reaction at the photocathode 29 and water oxidation at the photoanode 28.

The composite electrodes avoid some of the individual problems of bi-photoelectrode and hybrid systems. For example, the more efficient, low bandgap semiconductor in the solid state PV cell is paired with a wide bandgap stable, but less efficient TCM such as a metal oxide. The semiconductor with lowest bandgap determines the efficiency. In the preferred embodiment, both photoelectrodes 28, 29 are based on the proven high efficiency and stability CIS semiconductor material and its alloys. The CIS material may be a single crystal, co-evaporated film or electrodeposited film, on a conducting foil substrate or glass with a conducting contact. Electrochemical fabrication of CIS on a flexible lightweight foil offers substantial cost and weight reduction potential, while still retaining high efficiency. The glass substrate provides rigidity and transparency for specific PEC cell designs.

Figure 2:
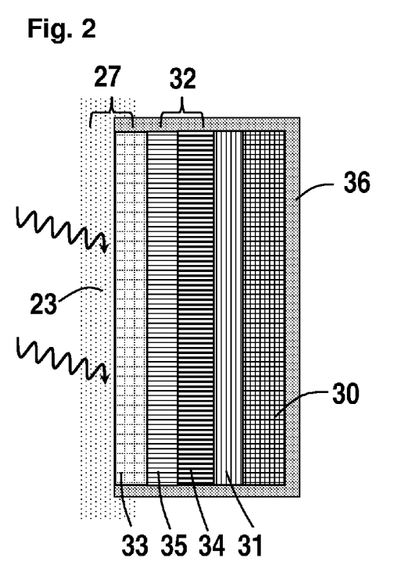
FIG. 2 Shows a cross sectional representative schematic of a photoanode comprising substrate/contact/n-absorber/p-buffer/TCM making electrolytic contact with the solution.

FIG. 2 shows a cross sectional view of the photoanode 28. It comprises a double-junction device fabricated on a substrate 30 which may be provided with a conducting contact layer 31. The substrate 30 may be a metal foil, or glass coated with a conducting contact 31 such as Mo or ITO. The device includes an n/p solid-state PV junction 32 in tandem with a TCM 33 that forms an electrolytic junction with the electrolyte 23. The photoanode 28 is illuminated through the top TCM/electrolyte junction 27. However most of the absorption takes place in the n/p solid-state PV junction 32 below the electrolytic junction.

In the preferred embodiment, the n/p PV junction 32 is made with an n-CIS absorber 34 and a p-type buffer 35 to form n/p PV junction 32, as described in our US patent application No. 20030230338. A thin film of n-CIS 34 may be electrodeposited directly on a conducting foil substrate 30 without the need for a contact 31 layer. CIS films with n-type conductivity and ordered defect chalcopyrite stoichiometries with Cu:In:Se ratios of 1:1:2, 1:2:3.5, 1:3:5, . . . etc. may electrodeposited in one-step as described in our US patent application No. 20030230338. The n-CIS films include CIS alloys with other elements from groups I-III, V and VI that may increase their efficiency or stability. The n-CIS films are recrystallized using rapid thermal processing. In the preferred embodiment the p-buffer is $CuISe_3$, created by PEC surface conversion in acidic Cu-polyiodide electrolyte as described in U.S. Pat. No. 5,286,306. The resulting n-CIS/p-$CuISe_3$ heterostructure 32 minimizes defects in the crucial space charge region and reduces recombination for enhanced device efficiency.

The top surface of the n/p heterostructure 32 is coated with a TCM layer 33. In addition to being transparent and conducting, this TCM layer 33 should be corrosion resistant in the electrolyte 23 and have catalytic properties for $O_2$ evolution reaction. The TCM layer 33 can be selected from a number of materials that are resistant to electrochemical corrosion and have catalytic properties for $O_2$ evolution reaction, such as $TiO_2$, $Fe_2O_3$, $WO_3$, $RuO_2$, $SnO_2$, $Sn(F)O_2$, etc. and modifications from these basic materials. These materials may be alloyed with other elements such as Ca or Mg to adjust the bandgap or to remove the rectifying junction between these oxides and electrodes as suggested in US patent application No. 20050211290. Other materials such as mixed oxides like $SrTiO_3$, p-$CuInO_2$, i-$ZnSnO_2$ offer the possibility of tailoring their band gap by altering their composition to be compatible with an n-CIS/p-$CuISe_3$ type device 32, as well as the electrolyte 23.

Various approaches including doping, alloying, and surface modification can be used to achieve an ohmic contact between the TCM 33 and electrolyte 23. Nitrides and carbides of Group IB, III and IV can also be used as TCM 33 coatings. Transparent conducting carbon nanotubes and corrosion resistant polymer nanocomposites can serve as TCMs 33. Organic nanocomposites can be made sufficiently conductive for use as the TCM 33 coating by adding a small amount of metal. Various methods, such as spin coating or spray pyrolysis, sputtering, evaporation, chemical vapor deposition, chemical bath deposition or electrodeposition may be used for these coatings. The edges of the photoanode 28 and the photocathode 29 are insulated from exposure to the solution 23 by an encapsulating film 36.

Figure 3:
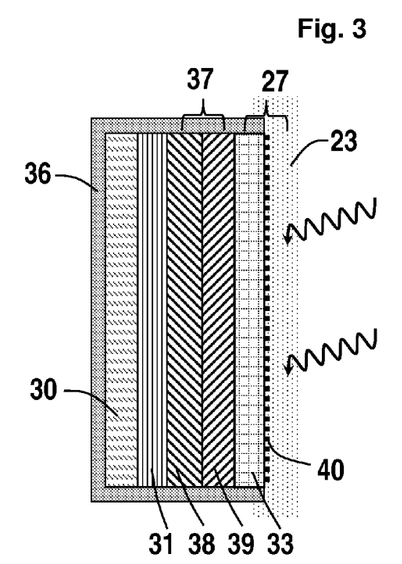
FIG. 3 Shows a cross sectional representative schematic of a photocathode comprising substrate/contact/p-absorber/n-buffer/TCM (catalyst) making electrolytic contact with the solution.

FIG. 3 shows a cross sectional view of the photocathode 29 comprising a substrate 30, a back contact 31, p/n junction 37 PV cell in tandem with a TCM 33 and electrolyte 23 junction. Typical substrate 30 may be a metal foil or glass/Mo. Commercial Mo/p-CIGS/n-CdS PV cells can be adapted to produce a stable and efficient photocathode for $H_2$ generation. The preferred embodiment uses an absorber 38 made from p-CIS. The p-CIS absorber 38 includes CIS alloys with gallium, sulfur or other Group I, III and VI elements. The p-CIS absorber 38 is preferably electrochemically fabricated in order to reduce cost. Alternately, the p-CIS films 38 can be made by conventional vapor phase methods. An n-type buffer 39, such as n-CdS, n-ZnS and other commonly used buffer materials for p-CIS PV cells, will form a p/n PV junction 37 with the p-CIS absorber 38.

The p/n junction 37 is coated with TCM 33 containing a $H_2$ evolution catalyst 40 such as Pt. The catalyst may be applied directly on the n-buffer 39 layer to reduce the overvoltage losses associated with the noncatalytic buffer/electrolyte interface 27. For example, a thin layer of platinum catalyst 40 may be electrodeposited on the CdS surface from a 20 mM $H_2PtCl_6$ solution. Photoassisted galvanostatic deposition can be performed at a cathodic current density of 1 mA/cm$^2$, with a Pt deposit quantity corresponding to a charge of 10 mC/cm$^2$. J. K. Nørskov et al indicate that Pt is a better electrocatalyst than other metals for $H_2$ evolution, primarily because the evolution reaction is thermo-neutral on Pt at the equilibrium potential. The platinum catalyst also may provide corrosion-protection for the semiconductor [Bogdanoff et al]. A discontinuous layer of Pt particles can be electrodeposited from 1 mM $K_2PtCl_6$+0.1M $HClO_4$ using a constant current of 100 μA (500 μA/cm$^2$) and a variable deposition time from 100 to 700s.

Various other methods are available for incorporating Pt catalyst into the photocathode, such as using the ceramic catalyst of Pt dispersed alumina [Kinumoto et al], a two-stage spray pyrolysis of 1% by weight solution of $H_2PtCl_6$ [Ho et al], freeze-drying $H_2PtCl_6$ on an oxide layer followed by reduction in hydrogen [Abbaro et al], etc. Alternate catalytic metals such as Co, Ru, Pd, Rh and Ni can also be used. The catalyst may be supported on a carrier layer comprising at least one member selected from the group consisting of alumina, zirconia, titania, ceria, magnesia, lanthania, niobia, yttria and iron oxide and mixtures thereof.

Alternately a wide gap TCM 33 selected from the oxides, nitrides, carbides or polymers can be used for the photocathode provided that the TCM 33 forms an efficient junction with the electrolyte to generate sufficient current for water reduction. The TCM 33 is also required to be compatible with the n-type buffer component of the photocathode 29. The edges of the photocathode are insulated from exposure to the solution 23 by an encapsulant 36.

The photocathode 29 and the photoanode 28 are combined in a PEC cell containing the electrolyte 23 as shown in FIG. 1. The combination can provide a total photovoltage of V (cell)= $V_{hv}^A + V_{hv}^C$ for the device to allow spontaneous water splitting. Coupling the 2 photoelectrodes is anticipated to exceed the minimum (1.6V) that is required to spontaneously drive the water splitting reaction.

Figure 4:
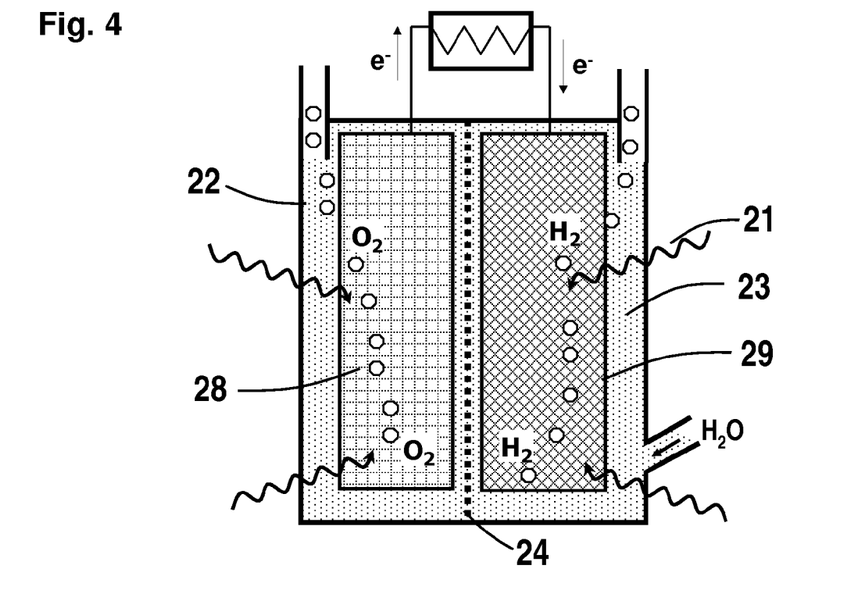
FIG. 4 Shows a PEC cell with the photoanode and the photocathode, mounted in a side-by-side configuration to generate $H_2$ and $O_2$ separately.

The photoanode 28 and photocathode 29 used for the PEC cell of FIG. 4 are mounted in a side-by-side stacked configuration to generate $H_2$ and $O_2$ separately. They may be constructed on flexible foil substrate 30. The PEC cell design dictates the placement of the membrane 24 in the various embodiments. For example the membrane 24 can be installed in the same direction as the radiation or behind one substrate 30. A cation-exchange membrane 24 can be used for the conduction of $H^+$ for the acidic electrolyte and anion-exchange membrane can be used for the conduction of $OH^-$ in the alkaline electrolyte. When the membranes 24 are installed perpendicular to the photoelectrode (for example, vertically), the $H_2$ and $O_2$ gases can be separated by gravity, away from the membrane 24. In this way, the required thickness of membrane 24 is small, leading to significant reduction in material cost and increased conduction of ions.

Figure 5:
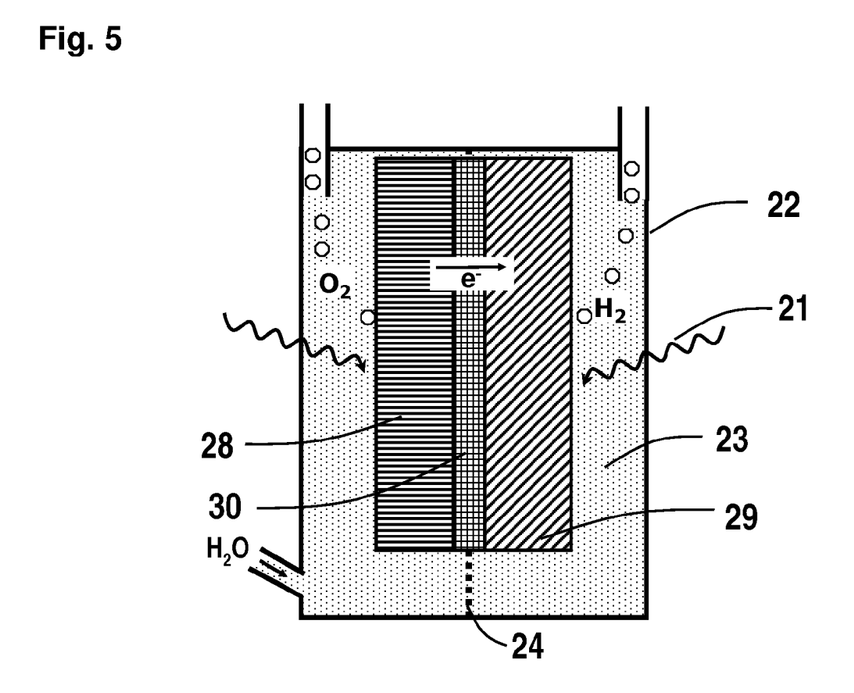
FIG. 5 Shows a PEC cell with the two photoelectrodes, combined on a single central conducting substrate for bifacial illumination.

In FIG. 5, the photoanode 28 and photocathode 29 are combined on a single central substrate. By using a common substrate 30 made from a conducting material such as steel, the external electrical circuit can be eliminated. The electrodes are illuminated from opposite sides of the PEC cell with the light radiation impinging on both electrode faces in direction perpendicular to the plane of the substrate. Such devices may be used in applications where bifacial illumination is available, such as on certain aircraft or spacecraft parts.

Figure 6A:
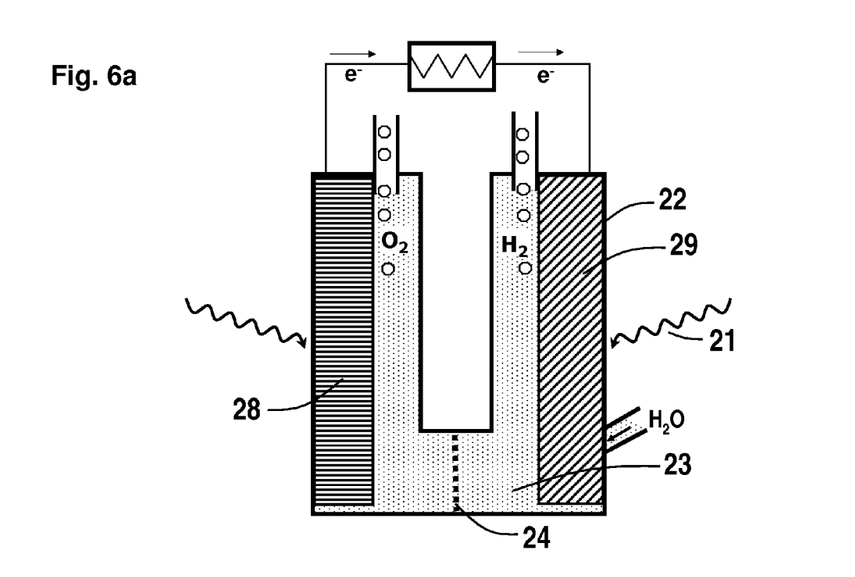

In FIG. 6a, the photoanode 28 and photocathode 29 are constructed directly on the wall of the electrolysis cell 22 in superstrate configuration, i.e. the cell 22 wall serves as the superstrate for each of the electrodes and the light comes in through the cell 22 wall and back contact 31 into each absorber 34, 38 layer. The surface of the photoanode 28 and photocathode 29, in contact with the electrolyte should be catalytic for the $O_2$ and $H_2$ evolution reactions, respectively. A TCM is also required to serve as the contact 31 material between the cell 22 wall and the absorber 34.

Figure 6B:
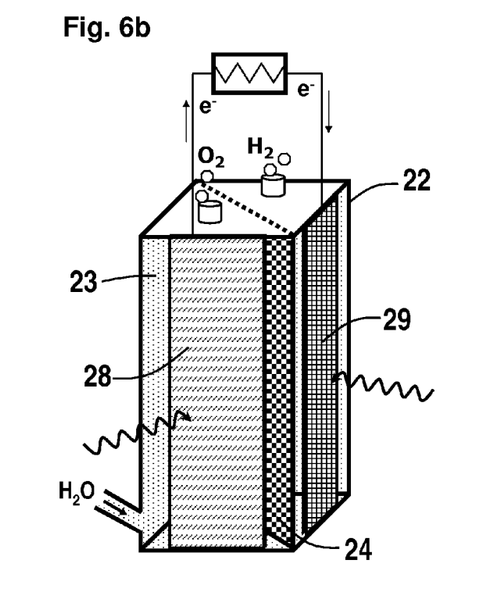
Figure 6C:
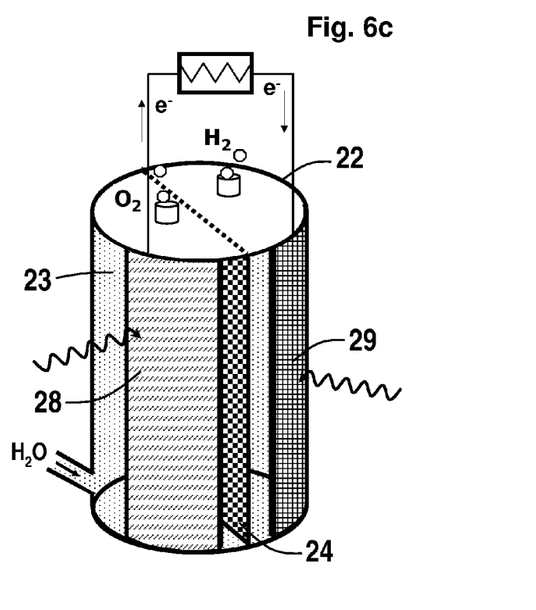

The photoelectrodes 28, 29 may also be constructed on adjacent walls of the cell 22. FIG. 6b shows a 2-dimensional view of a PEC cell 20 with the photoelectrodes 28, 29 on either side of the cell 22. The separator membrane is impervious to the gases and is only provided near the lower end of the device to maintain separation between the gases. The illumination for the photoelectrodes 28, 29 is provided through the transparent walls of the cell 22. Such superstrate-based photoelectrodes can also be constructed on curved walls of an oval or circular shaped cell 22 in FIG. 6c. Further such cell 22 wall based photoelectrodes 28, 29 may also be configured with appropriate components in a substrate configuration. The main consideration for the substrate version is that the back contact of each photoelectrode is a TCM and the respective front component contacting the electrolyte has catalytic properties for $H_2$ and $O_2$ evolution reactions.

Figure 7:
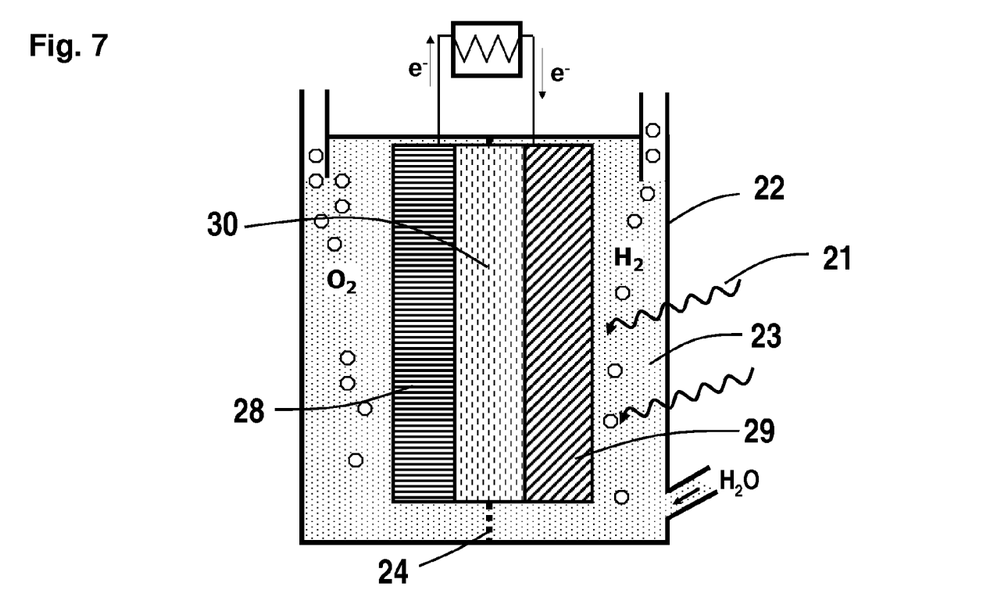
FIG. 7 Shows a PEC cell with the two photoelectrodes combined into a monolithically stacked device on either side of a single TCM coated transparent substrate to maximize photon absorption with one-sided illumination. The device is illuminated through a wider gap p-type photocathode.

In FIG. 7, the n-CIS based 28 and a p-CIS based 29 photoelectrodes are combined into a monolithically stacked device on a single TCM coated transparent substrate 30 to maximize photon absorption with one-sided illumination. In this case the system 20 can be illuminated through a wider gap p-type photocathode 29 based on $p-CuGaSe_2$, p-CuO, p-CuI or p-CuSCN absorber 38. Efficiency gains are possible if the n-CIS device is used in a tandem structure with a p-type PV cell perpendicular to incoming light. The n-CIS photoanode can be constructed on TCM coated substrate 30 either in superstrate or substrate configuration.

Figure 8:
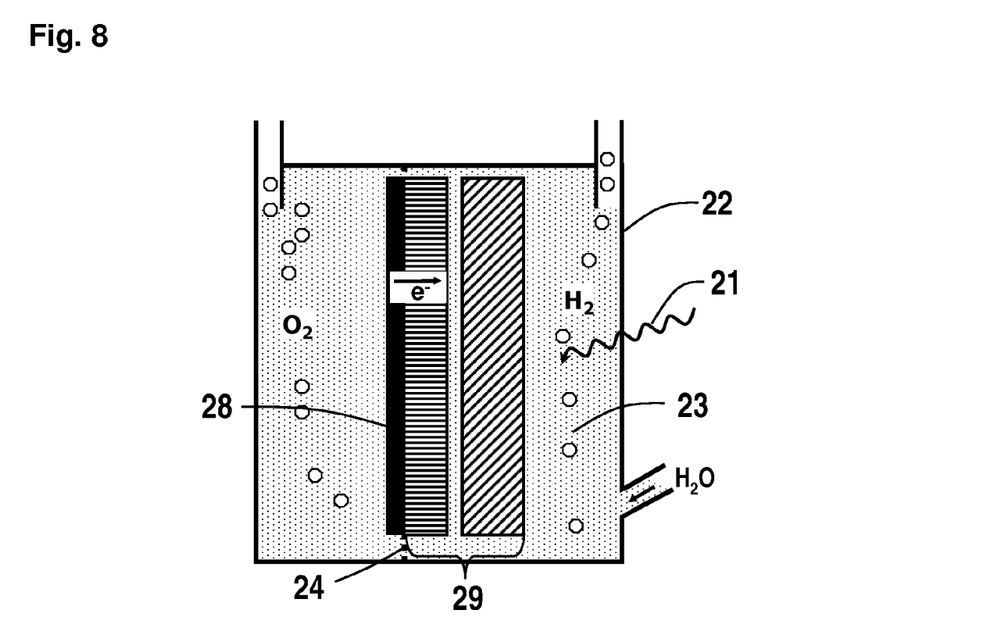
FIG. 8 Shows a PEC cell with an inert metal anode and photocathode which combines n-CIS and p-CIS based devices in tandem through a tunnel junction.

In FIG. 8, the n-CIS and p-CIS based photoelectrodes separated by a tunnel junction are combined into tandem photocathode 29. The p-CIS may be constructed from a wider band material such as copper gallium sulfide. The photocathode is combined with an inert metal anode 28 in electrical contact with the conducting substrate of the n-CIS PV device in the PEC cell.

Figure 9:
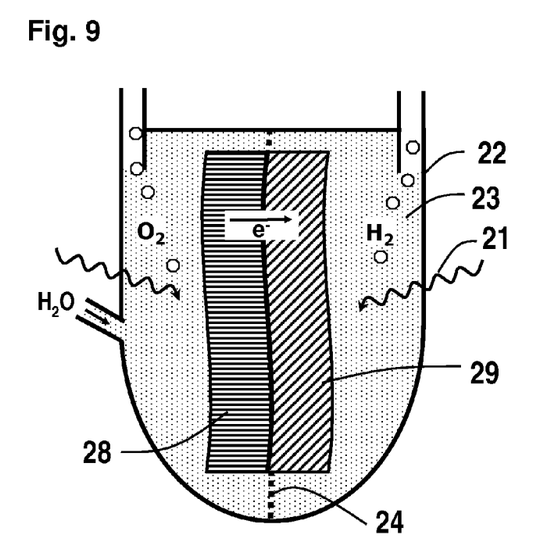
FIG. 9 Shows the PEC cell of FIG. 1 based on lightweight, low-density transparent polymer materials.

The glass or metal substrates 30 used for the photoanode 28 or the photocathode 29 may be replaced by TCM coated low-density transparent polymer foil to decrease weight of the system 20. The PEC cell container 22 can also be constructed from a transparent plastic. FIG. 9 shows a polymer-based version of FIG. 1. The polymer electrodes can be used in any of the embodiments shown in FIGS. 4-8.

Figure 10:
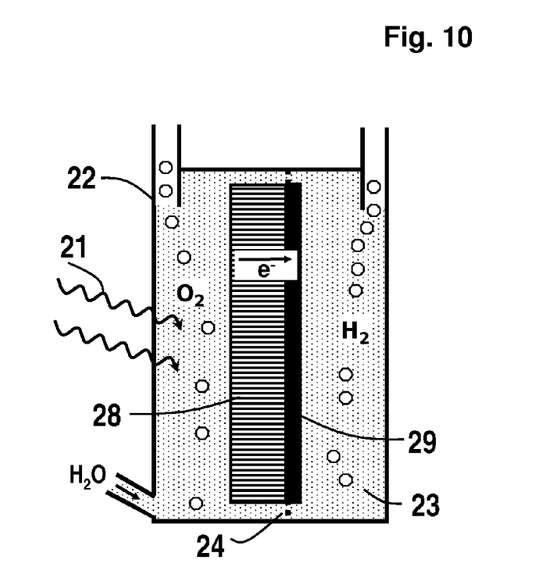
FIG. 10 Shows one side illuminated PEC cell comprising a hybrid photoanode based on a conducting substrate that makes electrical contact to an inert metal cathode.

FIG. 10 shows a simplified design of system 20 in which an inert metal cathode 29 such as platinum, titanium, graphite, steel, platinized metal, doped polymer or TCM replaces the photocathode. This cathode 29 contacts the back of the conducting substrate 30 of an n-CIS photoanode.

Figure 11A:
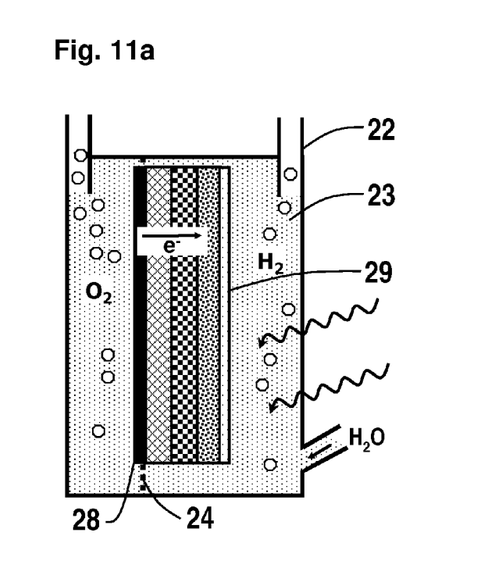
Figure 11B:
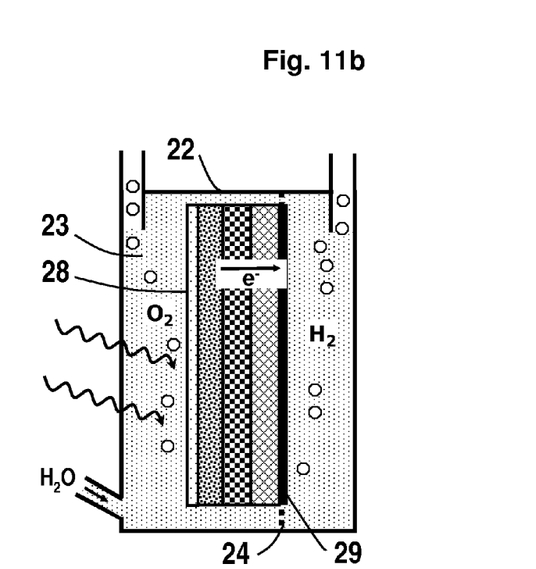
Figure 11C:
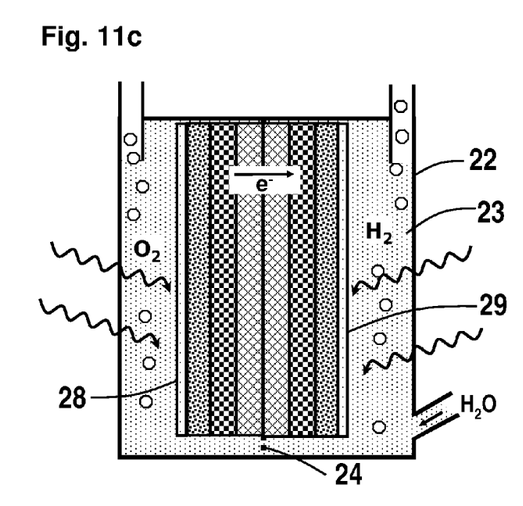

FIG. 11a shows a PEC cell such as that shown in FIG. 8, but using multijunction photoanode 28 and including additional PV junctions to absorb light of different wavelengths. This photoanode 28 can generate a cell voltage that is high enough to split water. The individual solid state junctions 32, 33 constituting the multijunction photoelectrode may be constructed from CIS based absorbers in the form of thin film or nanoparticles combined with conducting organic polymers. Subcells made from variants of the basic n-CIS PV cell 28 are described in our U.S. patent application Ser. No. 11/420,674. Such a multijunction PV device may be also constructed from p-CIS based PV subcells to serve as photocathode 29, FIG. 11b. Alternately multijunction photoanode 28 and photocathode 29 can be combined in a single PEC cell to realize a very high efficiency water splitting device, FIG. 11c.

An alternate approach to circumvent the problem of matching the cell voltage with the water splitting voltage is by PEC decomposition of a hydrogen halide. Hydrogen can be produced from a hydrogen halide at a much lower voltage than by direct electrolysis of water. This approach provides the advantage of reducing the amount of electrical energy required. Water can be chemically reacted with a halogen gas to form a hydrogen halide, and then the resulting hydrogen halide can be electrolyzed to form hydrogen as described in U.S. Pat. No. 5,709,791.

Figure 12:
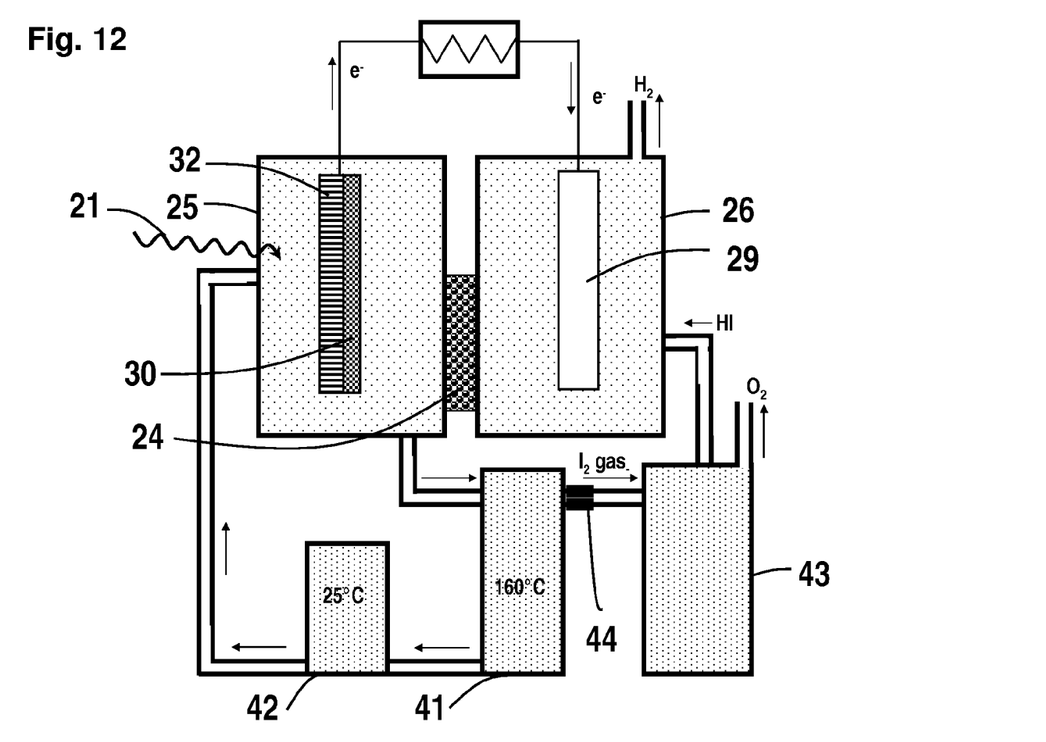
FIG. 12 Shows hydrogen generation through successive reactions involving the photogeneration of $I_2$ at the n-CIS/p-CuI$Se_3$ photoanode, chemical generation of HI and $O_2$, and the reduction of HI at the cathode.

To achieve such a path with CIS based photoelectrodes, the basic PEC system of FIG. 1 is modified to include intermediate chemical reactions. The preferred embodiment uses HI formation and decomposition reactions for the immediate steps. FIG. 12 shows water splitting via iodide ($I^-$) photooxidation in a PEC system 20 containing $CuI$—$I^-/I_2$—HI solution and an n-CIS/$p-CuISe_3$ n/p junction 32 preferably without a TCM 33 layer. The anode compartment 25 is connected to a cathode compartment 26 through an anion selective membrane 24 that is impermeable to $Cu^+$ diffusion. The membrane 24 may contain a solid polymer and a ceramic electrolyte with Ittria. The anode compartment 25 is connected to 2 additional compartments 41 and 42. Compartment 41 provides for heating the electrolyte to 160° C. Compartment 41 is connected to an additional compartment 43 through a hydrophobic membrane 44 having a pore diameter of preferably 1-3 μm. The cathode compartment 26 contains a Pt metallized inert metal cathode or photocathode 29 similar to that shown in FIG. 3.

Upon illumination, iodine is generated at the photoanode 28 via reaction $2I^- \rightarrow I_2 + 2e^-$. The solution gets pumped through the compartments 41 and 43 through various exits and inlet valves. The 160° C. temperature in compartment 41 sublimes the $I_2$, which then passes though the hydrophobic membrane 44 into compartment 43 as described in U.S. Pat. No. 6,071,327. The $I_2$ gas is separated by passing the $I_2$-containing phase through a porous hydrophobic separation membrane 44, which retains the $I_2$ gas on the upstream side of the phase flow and removes the $I_2$ gas-free phase during the downstream side of the separation membrane. In addition, a fluororesin membrane such as polyethylene tetrafluoride, which itself is hydrophobic, i.e. impermeable to water but permeable to steam is used in combination with this separation membrane.

Alternatively, a water-repellent membrane based on $SiO_2$ may be formed by coating a hydrophobic resin such as a fluororesin onto a porous material such as a metal (hastelloy or stainless steel, etc.), a ceramic, a glass filter or a foam material, or by a sol-gel method. The separation membrane 44 is secured by metal or ceramic porous plates (60 μm pore size). The valves are opened when the pressure reaches approximately 0.2 MPa. gas is collected with the valves open until the pressure falls to 0.1 MPa. Furthermore, the temperature of the pipe is adjusted with heater, to prevent the $I_2$ from clogging the pipe at low temperatures. The $I_2$ reacts with water in chamber 43 through a catalytic reaction with activated carbon or Pt/γ-alumina catalyst via reaction: $I_2$+$H_2O \rightarrow HI+O_2$, to produce $O_2$ gas. The $O_2$ gas is collected and HI solution is pumped into the cathode compartment 26 where it is reduced at the cathode via reaction: $HI+e^- \rightarrow \frac{1}{2}H_2+I^-$ to generate $H_2$ gas. The $H_2$ gas is collected and I— diffuses into the anode chamber 25. This chamber 25 is also fed by the $I_2$ free solution from chamber 41 that is pre-cooled to room temperature in chamber 42.

The PEC system of FIG. 12 also generates $H_2$ and $O_2$ from water and sunlight only. The other chemicals used are regenerated in the total cycle. This system offers the advantage of not requiring the complex electrode structures need to generate large voltages for spontaneous photoelectrolysis in the multijunction photoelectrode based PEC cells of FIG. 11. This system trades the photoelectrode complexity with a more elaborate chamber design. It is to be understood that the invention system of FIG. 12 contemplates many alternate designs, configuration and several variations of methods to make the photoelectrodes and other components in different chambers. In fact most of the photoelectrode and PEC cell designs shown in FIGS. 4-8 may be adapted for the iodide based $H_2$ generation system.

Figure 13:
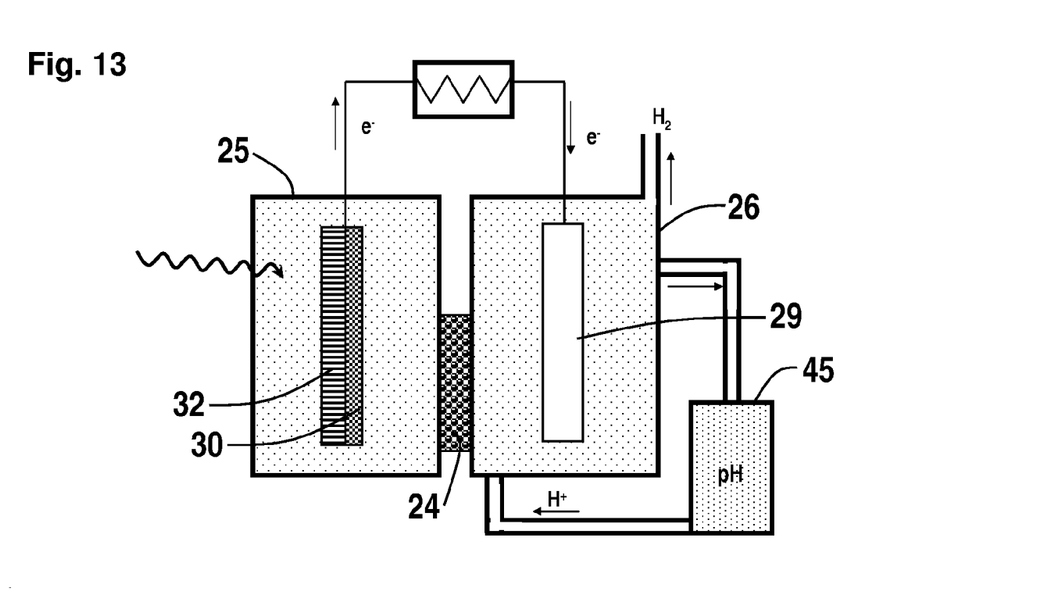
FIG. 13 Shows hydrogen generation at a cathode during photooxidation of $I^-$ at the n-CIS/p-CuI$Se_3$ photoanode; a third compartment controls the pH in the cathode compartment.

Alternate chemical reactions and chamber designs are also possible, such as the variant shown in FIG. 13, depicting $H_2$ generation at a cathode 29 driven by the photooxidation of $I^-$ at an n-CIS/p-CuISe$_3$ photoanode 28. The anode 25 and cathode 26 sections are separated by a membrane or frit 24. The anode compartment 25 contains a HI—$I^-$—CuI solution saturated with sufficient CuI to reduce the photogenerated $I_2$. The anode 28 is n-CIS/p-CuISe$_3$ junction 32. The cathode compartment 26 contains acidified water with no Cu or $I_2$. The same HI acid may be used in both compartments. Illumination of the n-CIS electrode 28 leads to $I^-$ oxidation. The CuI will reduce the $I_2$ formed to $I^-$ and $Cu^{2+}$. The cathodic reaction will be $H_2$ evolution. The changes in pH in the cathode compartment 26 require adjustment by acidifying, to neutralize the $OH^-$ ions produced.

The above PEC cell designs require a small amount of electrolyte and low cost materials, making the system lightweight, portable and low cost. The above PEC systems can lead to a self-sustained, stand-alone system for $H_2$ generation by combining it with gas collecting containers, electrolyte circulating pumps, supporting structures and auxiliary components. Various alternative embodiments can be devised to reduce costs and weight. For example the PEC cell can be designed to make the best use of gravity to separate the gases generated in different compartments. In this way, the use of membrane can be minimized or totally avoided.

The above disclosed PEC cell and system has been outlined in broad terms to state the more important features of the invention. The invention is capable of other embodiments and of being practiced and carried out in various other ways not specifically described here. The invention offers significant advantages such as reliable energy conversion efficiency, efficient electrolysis, low cost, and high durability. For multijunction photoelectrodes, the voltage can be >1.6 V, which is sufficient for water electrolysis. The energy can be stored in form of $H_2$. When used in combination with portable fuel cells, this PEC system can provide portable power, transportation, residential, industrial and distributed power generation systems in remote locations, backup power stations, battery replacement, portable power generation, electric vehicles, and marine power stations.

The above detailed description of the present invention is given for explanatory purposes. All references disclosed herein are expressly incorporated herein by reference. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

What is claimed is:

1. A device for photoelectrolysis of water, comprising at least one electrolyte with no added redox couple and a composite photoelectrode, having a top cell in electrical contact to a bottom cell wherein said bottom cell is a solid-state junction between n-type copper indium selenide (n-CIS) and a p-type junction partner, and said n-CIS is selected from the $(Cu_2Se)(In_2Se_3)_{n+1}$ group of semiconducting compounds, where n is an integer >0.

2. The device of claim 1, comprising at least one second photoelectrode containing a p-type first component based CIS-alloy (p-CIS).

3. The device of claim 2, wherein said n-CIS and said p-CIS photoelectrodes are separated by a tunnel junction and combined into a tandem photocathode, and said p-CIS is constructed from a wider band material such as copper gallium sulfide.

4. The device of claim 2, wherein at least one said photoelectrode has multiple junctions comprising subcells made from variants of said n-CIS PV junction and said p-CIS junction to generate sufficient voltage for electrolysis.

5. The device of claim 2, in which at least one said CIS first component of said photoelectrode is made by electrodeposition.

6. The device of claim 2, in which at least one said photoelectrode is constructed on a transparent wall of the chamber containing said electrolyte.

7. The device of claim 2 in which said cell and said photoelectrodes are constructed from lightweight, low-density transparent polymeric materials.

8. The device of claim 2, in which said n-CIS and said p-CIS photoelectrodes are constructed on two sides of a single substrate.

9. The device of claim 1, wherein said n-CIS photoelectrode is alloyed with other elements from groups I-III, V and VI.

10. The device of claim 1, wherein said top cell is a liquid junction between said electrolyte and a corrosion-resistant transparent conducting material (TCM), having a bandgap larger than said CIS semiconductor and selected from a group of oxide, carbide, nitrate, carbon, organic, polymeric and composite materials.

11. The device of claim 10, wherein said TCM is doped with at least one other element including halogens and mixtures thereof, to enhance corrosion resistance and catalytic properties for oxygen evolution.

12. A device for photoelectrolysis of water, comprising a series of interconnected chambers wherein a copper halide and hydrogen halide electrolyte is photo-oxidized at an n-CIS photoanode in one said chamber; and resulting products from said electrolyte are transported and thermo-chemically processed through next said interconnected chambers to regeneratively produce $O_2$ gas, and $H_2$ gas is produced at a cathode.

13. The device of claim 12 wherein at least one said electrolyte contains HI and iodide salt.

14. The device of claim 13 wherein the generation of $H_2$ and $O_2$ proceeds via intermediate steps of PEC formation of $I_2$, separation of $I_2$ from said electrolyte and formation and decomposition of HI.

15. The device of claim 14 wherein said photoelectrode, comprising an n-CIS/p-CuISe$_3$ junction generates said iodine by photooxidation of said iodide salt.

16. The device of claim 14 wherein said I$_2$ separates from said electrolyte by sublimation and passing through a hydrophobic separation membrane.

17. The device of claim 14 wherein said I$_2$ reacts with water through a catalytic reaction to generate HI and O$_2$ gas and said HI decomposes into H$_2$ and I$^-$ at a cathode.

18. The device of claim 17 wherein said cathode comprises a p-CIS based solid-state p/n photovoltaic junction.

19. The device of claim 12 wherein photo-oxidation of iodide reaction at said photoelectrode drives hydrogen generation reaction at a cathode.

20. The device of claim 19, wherein said photoelectrode and said cathode are placed in separate compartments linked by at least one ion-exchange membrane that is impermeable to Cu$^+$ diffusion.

* * * * *